United States Patent [19]

You

[11] 4,393,024
[45] Jul. 12, 1983

[54] METHOD OF PRODUCING A RACKET FRAME

[76] Inventor: Chin-San You, No. 3, Lane 1019, Fong-Shih Rd., Fong Yuan City, Taiwan

[21] Appl. No.: 332,312

[22] Filed: Dec. 18, 1981

[51] Int. Cl.³ .................. B29C 17/08; B29D 3/02
[52] U.S. Cl. ................................. 264/162; 264/213; 264/219; 264/221; 264/257; 264/313; 264/317; 264/334; 264/339; 273/73 F
[58] Field of Search ............... 264/137, 258, 313, 317, 264/162, 339, 219, 257, 334, 138, 294, 213, 300, 261, 263; 273/73 R, 73 F

[56] References Cited

U.S. PATENT DOCUMENTS

| | | | |
|---|---|---|---|
| 2,668,987 | 2/1954 | Harris et al. | 264/313 |
| 3,641,230 | 2/1972 | Jenks | 264/137 |
| 3,825,646 | 7/1974 | Delmotte | 264/317 |
| 3,993,308 | 11/1976 | Jenks | 264/258 |
| 4,031,181 | 6/1977 | Schaefer et al. | 264/137 |
| 4,183,776 | 1/1980 | Staubet et al. | 264/313 |

Primary Examiner—Willard E. Hoag
Attorney, Agent, or Firm—McCormick, Paulding & Huber

[57] ABSTRACT

A racket frame is made by molding a thermosetting resin composition together with reinforcing fibers. Molds are made of flexible strip members, such as plastics, wood pulp, paper pulp, wood, bamboo, etc., which are bent to form a racket frame in a fitting, thereby reducing the production cost incurred in fabrication of expensive molds. The formed racket frame has no shell and core structure.

8 Claims, 9 Drawing Figures

METHOD OF PRODUCING A RACKET FRAME

BACKGROUND OF THE INVENTION

This invention relates to a method of producing a racket frame in which a fiber reinforced thermosetting resin is molded into a racket frame.

Composite racket frames generally include a shell made of a plurality of layers of thermorsetting resin-impregnated woven glass fibers or graphite fibers and a foam core intimately bonding with the shell. During the processing of such composite structure it usually need an internal pressure to force the shell to closely contact with the inner wall of the mold cavity to take the shape thereof. There are two methods of generating a sufficient internal pressure, i.e. direct method (blow molding) and indirect method (foam molding). In the first method the shell side is forced by the compressed air to closely contact with the inner wall of the mold cavity to take a predetermined shape. The hollow central portion is then provided with a foamable thermoplastic composition which will then be foamed and cured therein by heating. This additional step may incur further expenses during processing.

In the second method, a plurality of resin-impregnated woven fibers layers are wrapped around a foamable core composition and then put into a mold cavity for molding. When heating the foaming agent activates the core composition to generate a pressure to produce a desired molded shape after curing. Although the latter method is more simpler than the former one, the temperature for gelling and curing the resin-impregnated fibers and for foaming the thermoplastic resin are not the same. Therefore the pressure generated are not controllable and the resin from the core may penetrate into the shell layers, thereby destorying the orientation of the fiber as well as the reinforcement thereof.

SUMMARY OF THE INVENTION

According to the invention a method of making a racket frame comprises the steps of, preparing two elongated strip members, each having a length running from the handle portion, around the head portion and then back to the handle portion with an elongated mold cavity sections throughout its length; placing a thermosetting resin composition and fibers for reinforcing into said mold cavity sections; abutting two strip members together in face-to-face relation with the mold cavity sections thereof in opposing relation form a structural member defining an elongated mold cavity containing said thermosetting resin composition and fibres; and bending them to form a shape of a racket frame; curing at a certain temperature; and removing the strip members after curing.

The formed racket frame may have its cross-section either in I-shape or concave lens shape and also in the shape having a notch like part. The fibers used can be carbon, fiber, glass fiber, boron fiber, or other reinforcing materials.

The removal of strip members from the formed frame can be done either by grinding or by the use of a mold releasing agent.

An object of the invention is to provide a method which is applied for producing a fiber reinforced solid racket frame with no internal pressure to be provided during molding so as to take the shape of the mold.

This and other objects, features and advantages of the present invention will be more apparent in the following description of a preferred embodiment with reference to the accompanying drawings, in which;

DETAILED DESCRIPTION OF THE PREFERRED EMBODIMENT

Figure 1:
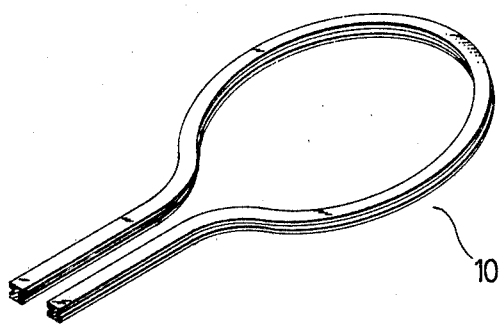
FIG. 1 is a perspective view of a racket frame according to the present invention.
Figure 4:
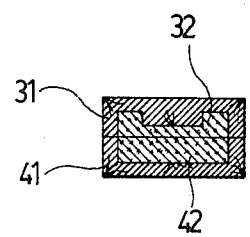
FIG. 4 is a cross-section of rack frame in third embodiment of the invention.
Figure 5:
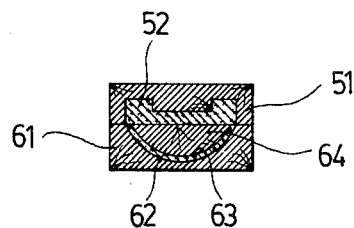
FIG. 5 is a cross-section of a racket frame in fourth embodiment of the invention.
Figure 2B:
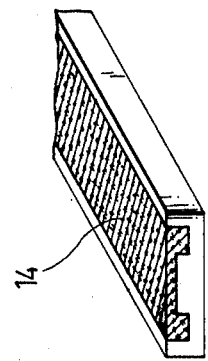
FIG. 2b is a perspective view of a strip member filled with a mold compound.
Figure 2D:
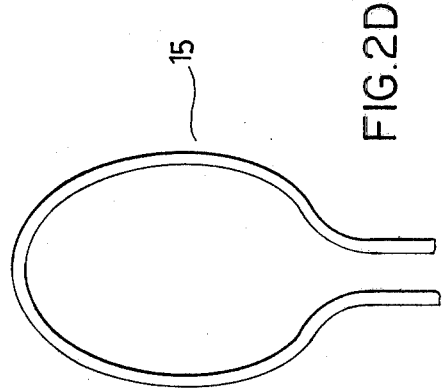
FIG. 2d is a plan view of the racket frame shown in FIG. 1.
Figure 2E:
FIG. 2e is a cross-section of a racket frame in first embodiment according to the invention.
Figure 2A:
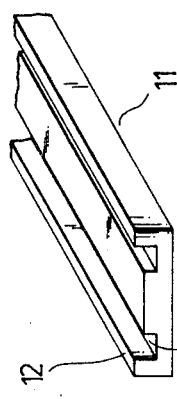
FIG. 2a is a perspective view of a flexible strip member according to the invention.
Figure 2C:
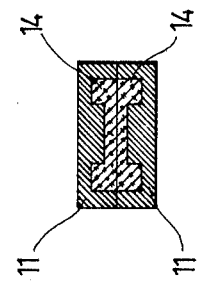
FIG. 2c is a cross-section of two abutted strip members.

As shown in FIGS. 1 and 2 a racket frame 10 according to the invention is made of a thermosetting resin reinforced with fibers, such as, carbon fiber, glass fibers, boron fibers, etc., by cast molding. Molds used in this invention are flexible strip members 11 having a length running from the handle portion, around the head portion and then back to the handle portion. Each of these strip members 11 has a mold cavity section 13 throughout its length. The two strip members are brought together in face-to-face relation and form a structural member which has a mold cavity. The cross section of the mold cavity may have various forms, such as I-shape (FIG. 2e), concave lens-Shape, (FIG. 3), rectangle with one side thereof grooved, (FIG. 4), rectangle with one side grooved and other side round (FIG. 5). These strip members 11 are used in place of rigid molds which may incur higher cost of molds fabrication. They are made of materials such as plastics, wood pulp, paper pulp, wood bamboo, etc. The plastic strip member can be made by extrusion or injection molding, whereas wood or bamboo can be machined to obtain a mold cavity.

During processing, the strip members 11 are filled with the thermosetting resin and fibers 14 and then two strip members 11 are brought together and bent into a racket frame shape which is then placed in a fitting for molding.

Figure 3:
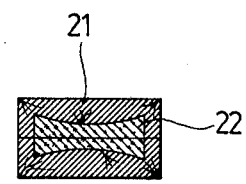
FIG. 3 is a cross-section of a racket in second embodiment frame according to the present invention.

In FIG. 3 two strip members 21 provide a racket frame 22 with its cross-section in a concave-lens shape. As shown in FIG. 4 two strip members 31 and 41 provide a frame having its cross-section in a combined rectangular shape 42 and U-shape 32. In FIG. 5 one strip member 51 has a groove in U-shape 52 and another strip member 61 has a curved groove 62. The groove 62 is firstly provided with a layer of fibers reinforced resin 63 and then filled with a wooden layer 64. Two strip members 51 and 61 are brought together and bent into a racket frame shape.

Afterwards, the resin is cured at a certain temperature. After curing the strip members can be removed by the use of a mold releasing agent or by grinding.

With the invention thus explained, it is apparent that obvious modifications and variations can be made without departing from the scope of the invention. It is therefore intended that the invention be limited only as indicated in the appended claims.

What I claim is:

1. A method for making a racket frame comprising the steps of preparing two elongated strip members each including two racket handle portions and a racket head portion intermediate said racket handle portions and defining an elongated mold cavity section extending throughout its length, placing a thermosetting resin composition and fibres for reinforcing into the mold cavity sections, bringing said two strip members together in face-to-face relation with the mold cavity sections thereof in opposing relation to each other to form a structural member defining an elongated mold cavity containing said thermosetting resin composition and fibres, bending said strip members to form a shape of a racket frame, curing said thermosetting resin composition, and removing the strip members which comprise said structural member after curing.

2. A method of making a racket frame as claimed in claim 1, wherein said structural member has its cross section in I-shape.

3. A method making a racket frame as claimed in claim 1, wherein said structural member has its cross section in concave lens-shape.

4. A method of making a racket frame as claimed in claim 1, wherein said structural member has its crossection having a notch like part.

5. A method of making a racket frame as claimed in claim 1, wherein the fibers are selected from the group consisting of carbon fiber, glass fiber and boron fiber.

6. A method of making a racket frame as claimed in claim 1, wherein the removal of strip members is done by grinding.

7. A method of making a racket frame as claimed in claim 1, wherein the removal of strip members is done by means of a mold releasing agent.

8. A method for making a racket frame as claimed in claim 1 wherein said strip members comprise flexible members and said method includes the additional step of placing the structural member in a fitting.

* * * * *